May 19, 1970  S. N. McKHANN  3,512,556
SELF-PROTECTIVE CONDUIT SYSTEM
Filed Sept. 20, 1967
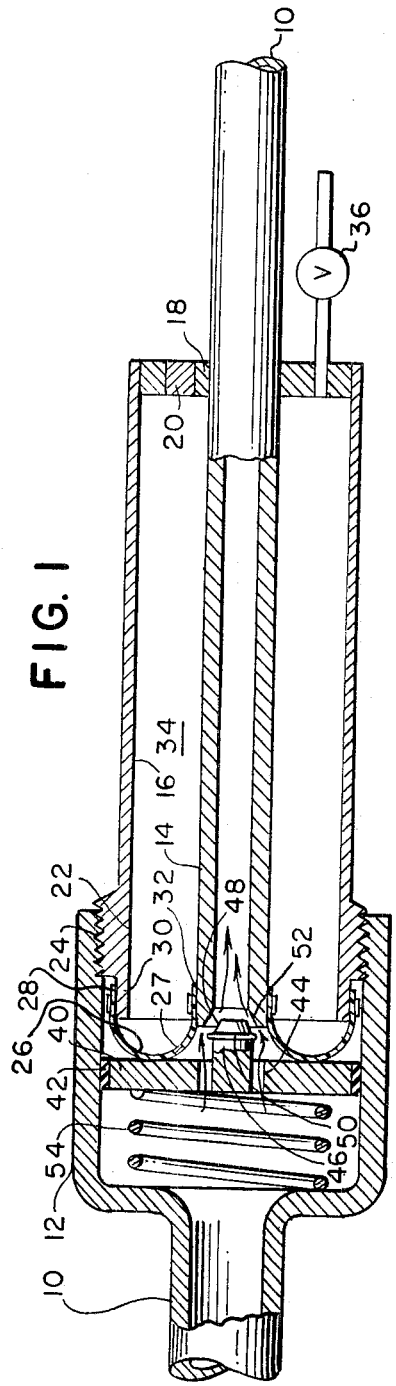
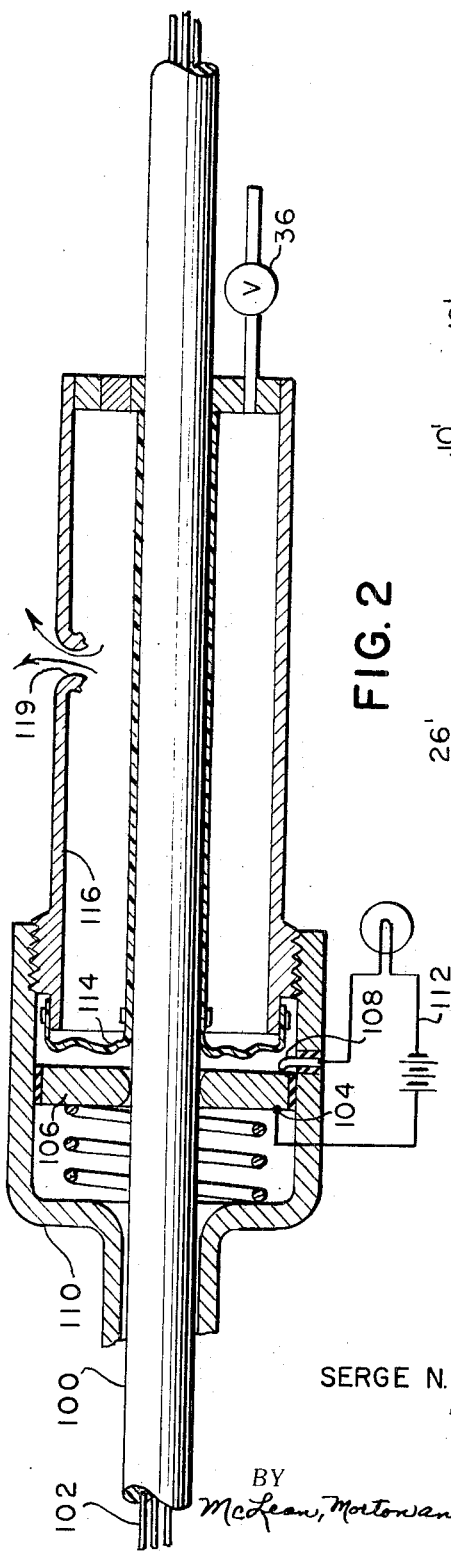
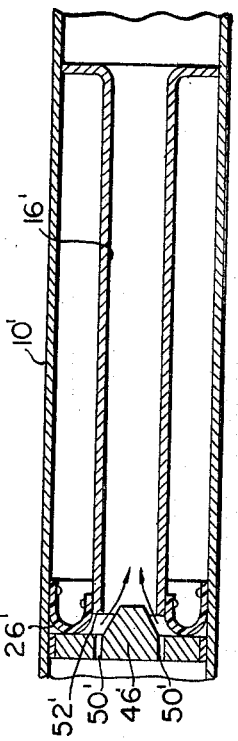
SERGE N. McKHANN
INVENTOR.
BY McLean, Morton and Boustead
ATTORNEYS United States Patent Office 3,512,556
Patented May 19, 1970

3,512,556
SELF-PROTECTIVE CONDUIT SYSTEM
Serge N. McKhann, 425 E. 63rd St.,
New York, N.Y. 10021
Filed Sept. 20, 1967, Ser. No. 669,038
Int. Cl. F16k 17/38
U.S. Cl. 137—71                                                    7 Claims

ABSTRACT OF THE DISCLOSURE

A self-protective, automatically closing conduit system is shown. A conduit for fluids or electrical transmission lines is surrounded by a mechanically rupturable jacket enclosing a fluid under pressure. The jacket acts as a shield to protect the conduit from mechanical damage. A pressure-responsive diaphragm in the jacket maintains a spring-biased conduit valve in an open position but upon rupture of the jacket the diaphragm collapses permitting the valve to close off the conduit from further flow. In a preferred embodiment the diaphragm contains a rupture disk.

---

This invention relates to a safety device for conduits, particularly for gas conduits which provides a measure of mechanical protection for the conduit while providing means to close the conduit when it is in danger of rupture. More specifically, the present invention relates to a jacketed conduit having a jacket of mechanically rupturable material enclosing a fluid under pressure, the jacketed conduit containing a pressure-responsive portion thereof responsive to the pressure in the jacket for maintaining a conduit valve in the open position, the conduit valve being biased-closed upon rupture of the protective jacket.

Conduits transporting liquids and gases and conduits transmitting electrical power are often located, for ready access, in streets and other areas where excavations and other mechanical operations occur. It is not uncommon for conduits to be struck and ruptured by excavating tools or by any of the many agencies employed in construction situations. Upon rupture the fluid in the conduit pours unabatedly into the surrounding areas causing fire hazards in the case of gases and some liquids, removal problems, in the case of liquids, and loss of valuable materials and other associated inconveniences in all cases. Moreover, small leaks in gas conduits, a source of serious explosions, and short-circuits or breaks in wires in electrical conduits, often are difficult and time consuming to locate which presently must be done by tedious search-and-find techniques.

In smaller gas conduits, such as those leading to appliances in homes and commercial establishments, there are at present mostly manually operated valves in the connections to the main gas conduits under the streets so that explosions from gas leaks in such main gas conduits can flash back into the smaller gas conduits. Also, flexible connections are being frequently used in homes and commercial establishments to connect appliances to the gas conduit source in a wall or other fixed location. Movement of these appliances can cause leaks in the connections or rupture of the connections themselves. Overheating of the appliance or the environment of the connections can also be dangerous.

It is thus the primary object of the present invention to provide an improved conduit system which is at once protected from mechanical damage and which has a self-closing safety feature if damage to the conduit system occurs or is likely to occur.

It is a further object of the invention to provide a simple, economical and portable conduit protection and safety system including a valve mechanism which may be adapted for use with gas or liquid carrying conduits or electrical transmission conduits.

It is still a further object of the invention to provide a flexible, protective safety device for conduits which acts as a shield for the conduit and upon rupture closes the conduit to further passage of fluid.

These and other objects of the invention are achieved in a self-protective, automatically closing conduit system which includes a conduit; a jacket of a mechanically rupturable material extending along a length of the conduit on the exterior and about the perimeter thereof enclosing a fluid under pressure; and a portion of the jacket responsive to the pressure in the jacket maintaining a shut-off valve associated with the conduit in an open position, the valve being biased-closed when the pressure in the jacket is released.

Preferred embodiments of the conduit system of this invention are shown in the accompanying drawings.

FIG. 1 is a lengthwise cross-sectional view of the conduit system showing the conduit, the protective jacket surrounding the conduit, and the valve mechanism which closes the conduit upon rupture of the protective jacket; and FIG. 2 is a lengthwise cross-sectional view of the conduit system adapted for use with an electrical transmission line and showing a ruptured protective jacket causing power in the transmission line to be cut off.

FIG. 3 is also a longitudinal section of another embodiment showing the conduit with the protective jacket within the conduit.

In FIG. 1, reference numeral 10 designates a cylindrical conduit for liquids or gases which can be of metallic or plastic construction. Fluid flows from left to right. Conduit 10 has expanded portion 12 which encompasses the valve mechanism to be described below and length 14 which is protected from mechanical damage by the fluid filled jacket also to be described below.

Reference numeral 16 refers to a cylindrical jacket about conduit length 14 which is comprised of a mechanically rupturable material such as a thin, semi-rigid wall of, for example a plastic material such as polyethylene, polystyrene, polypropylene or the like. Jacket 16 is bonded at one end to annular disk 18 which forms a seal around conduit length 14. Annular disk 18 is provided with fusible plug 20. At the upstream end of conduit length 14 jacket 16 terminates in a strengthened portion 22 which is threadedly connected at 24 to the end of expanded conduit section 12. An annular diaphragm 26 of flexible material, such as rubber or polyethylene, is affixed at its outer rim 28 to a step 30 in strengthened portion 22 of jacket 16 and at its inner rim 32 to the outer wall of conduit length 14. The zone 34 enclosed between jacket 16 and conduit length 14 is filled with a gas or liquid or combination of gas and liquid to provide a pressure in that zone sufficient to extend diaphragm 26 to the position shown. One gas which may be conveniently used in Freon and it may be introduced to zone 34 via valve 36 in annular disk 18.

Diaphragm 26 in its extended position abuts annular platen 40 movably mounted in expanded portion 12 of conduit 10. Platen 40 is smaller in diameter than expanded conduit 12 and thus has clearance 42 around its periphery for the passage of fluid from expanded conduit 12 to conduit length 14 and likewise has port 44 for that purpose. Platen 40 has a centrally located boss 46 provided with bevel surface 48 and O-ring 50 which are sized to enter into sealing relationship with bevel surface 52 of conduit length 14. Platen 40 is biased-closed by spring 54 when diaphragm 26 is collapsed, conduit section 14 being sealed off from further flow of fluid.

Diaphragm 26 can have included therein a rupture disk 27 such that when pressure in conduit 14 is reduced, pressure in zone 34 will cause rupture of the disk and hence collapse of diaphragm 26, biased-closure of platen 40 by spring 54 and sealing off of fluid flow in conduit section 14.

In FIG. 2 the structure is similar to that of FIG. 1 except that conduit 100 encloses a group of electrical conductors 102 in an electrical transmission line. An electrical contact 104 is provided in annular platen 106 and an electrical contact 108 is provided in and insulated from expanded pipe section 110 to provide for closure of an electrical circuit, designated generally by reference numeral 112, when platen 106 is spring-biased closed upon collapse of diaphragm 114. Electrical circuit 112 may be provided with an alarm or a light or other means to identify and signal the rupture of jacket 116 at this location. Jacket 116 is shown ruptured at 119, diaphragm 114 is collapsed, and contacts 104 and 108 are juxtaposed.

Similarly, the embodiment shown in FIG. 1 can be provided with electrical contacts and an electrical circuit actuating an alarm or light or other means to identify and signal the rupture of jacket 16. Where conduit 14 transports a combustible fluid, a pressure sensitive switch can, for example, be located in disk 18.

The safety device of this invention has wide application in the transmission of fuel gas. Thus where subsurface mains are in place, the safety device of this invention can be installed at intervals such that if the main is broken at a point between the installed devices, the drop in main pressure will automatically close the two adjacent devices preventing gas flow to the break. Also, a safety device of this invention can be installed at the connection of the gas main and the smaller conduit leading to a home or commercial establishment, such that a drop in main pressure will automatically shut off gas flow to the home and help prevent flash backs. Moreover, the safety devices of this invention can be incorporated in flexible connections connecting appliances to wall outlets, so as to protect against the possibility of rupture of the connections by appliance movement and to protect against overheating by means of the fusible plug.

The materials from which jackets 16 or 116 can be formed are any of those which provide a pressure-tight enclosure for the fluid under pressure and which likewise provide a measure of mechanical protection against rupture when struck by excavation or construction equipment. If conditions warrant, it may be desirable to provide a jacket about only a portion of the cross-sectional perimeter of a conduit. For example, only the top of an underground gas line which is not exposed to damage from below need be covered. It is within the skill of those in the art to determine the material, the thickness thereof, and the area of coverage for providing maximum protection for any given application. Likewise the length of the conduit which is protected depends upon the likelihood of damage, the fluid being carried and other economic considerations well understood by those skilled in the art. The valve and the particular configuration shown for enclosing the conduit and mating it with the protective jacket are not critical and other suitable structures can be provided.

Where desirable the measure of mechanical protection afforded by the jacket located externally of the conduit can be sacrificed and the pressure-tight enclosure can be formed between a portion of an existing conduit wall, which would serve as the jacket, and a liner located internally thereof. For example, a short section can be cut from an existing conduit, a length of liner can be run downstream from the cut into the inside of an existing conduit for any given length, the liner being bonded to the interior wall of the conduit at the downstream end and to the diaphragm at the upstream end. Rupture of the conduit wall is then required to release the pressure in the enclosure and actuate the conduit closure mechanism.

In FIG. 3 the structure is similar to that of FIG. 1 except that the jacket is within the conduit. Thus in FIG. 3, the conduit is 10′, the jacket is 16′, the valve is 46′, the openings are 50′ and the non-beveled surface of the jacket is 52′. The diaphragm is designated at 26′. The seal is made by an O-ring (not shown).

What is claimed is:

1. A self-protective, automatically closing conduit system comprising: a conduit; a jacket of a mechanically rupturable material on the exterior of said conduit extending along a length thereof and about at least a major portion of the outer perimeter thereof and in confining relationship thereto; fluid under pressure within the chamber defined by said jacket; a portion of said jacket being flexible and responsive to the pressure within said jacket, said flexible portion being extended under pressure and retracted upon release of pressure and means associated with said flexible portion of said jacket for causing the said conduit to be closed when said flexible portion is in a retracted position.

2. The conduit system of claim 1 wherein the flexible portion of said jacket contains a rupture disk and said rupture disk upon rupture provides fluid communication between the interior of the conduit and the chamber defined by the jacket.

3. A self-protective, automatically closing fluid flow pipe system comprising: a pipe; a jacket of a mechanically rupturable material on the exterior of said pipe extending along a length thereof and about the perimeter thereof and in confining relationship thereto; a fluid under pressure within the chamber defined by said jacket; a portion of said jacket being flexible and responsive to the pressure within said jacket, said flexible portion being extended under pressure and retracted upon release of pressure; and valve means for shutting off the flow within said pipe, said valve means coacting with the extended flexible portion of said jacket to maintain said valve in an open position when said flexible portion is extended and in a closed position when said flexible portion is retracted.

4. The pipe system of claim 3 wherein said valve means comprises a disk-shaped, spring-biased platen having valve surfaces connected therewith adapted to seal off said pipe from the flow of fluid.

5. The pipe system of claim 4 wherein said platen has a port for the passage of fluid and in fluid communication with the interior of said pipe and a centrally located boss having surfaces adapted to seal mating surfaces at an end of said pipe when said diaphragm is in a retracted position and said platen is biased against said pipe to arrest fluid flow therethrough.

6. The pipe system of claim 3 wherein said jacket contains a fusible plug to provide protection against damage by heat, melting of said plug providing communication between said chamber and the exterior of said jacket.

7. A self-protective, automatically closing fluid flow pipe system comprising: a pipe; a jacket of a mechanically rupturable material on the interior of said pipe extending along a length thereof and about a portion of the inner perimeter thereof and in confining relationship thereto; a fluid under pressure within the chamber defined by said jacket, a portion of said jacket being flexible and responsive to the pressure within said jacket, said flexible portion being extended under pressure and retracted upon release of pressure; and means associated with said flexible portion of said jacket for causing the said conduit to be open when said flexible portion is in an extended position and closed when said flexible portion is in a retracted position.

References Cited
UNITED STATES PATENTS

| | | | |
|---|---|---|---|
| 1,147,729 | 7/1915 | Hurlbrink | 222—53 X |
| 1,707,566 | 4/1929 | Perkins | 222—53 X |
| 2,413,087 | 12/1946 | Urbany | 137—312 X |
| 2,608,205 | 8/1952 | Proctor | 222—53 X |

WILLIAM F. O'DEA, Primary Examiner

R. GERARD, Assistant Examiner

U.S. Cl. X.R.

137—75, 466, 557; 340—242